Oct. 2, 1945.    D. SCIAKY    2,385,947
METHOD AND APPARATUS FOR RESISTANCE WELDING
Filed Aug. 4, 1943    4 Sheets-Sheet 1

INVENTOR.
David Sciaky,
BY
Wilkinson Huxley Byron & Knight
Attys

Oct. 2, 1945.   D. SCIAKY   2,385,947
METHOD AND APPARATUS FOR RESISTANCE WELDING
Filed Aug. 4, 1943    4 Sheets-Sheet 2

INVENTOR.
David Sciaky,
BY

Oct. 2, 1945.                D. SCIAKY                 2,385,947
            METHOD AND APPARATUS FOR RESISTANCE WELDING
                    Filed Aug. 4, 1943           4 Sheets-Sheet 3

AIR GAP
IN
IRON CORE
OF
TRANSFORMER

NO AIR GAP
IN
IRON CORE
OF
TRANSFORMER

INVENTOR.
David Sciaky,
BY

Oct. 2, 1945.   D. SCIAKY   2,385,947
METHOD AND APPARATUS FOR RESISTANCE WELDING
Filed Aug. 4, 1943    4 Sheets-Sheet 4

AIR GAP IN IRON CORE OF TRANSFORMER

INVENTOR.
David Sciaky,
BY

Patented Oct. 2, 1945

2,385,947

UNITED STATES PATENT OFFICE 2,385,947

METHOD AND APPARATUS FOR RESISTANCE WELDING

David Sciaky, Chicago, Ill., assignor to Welding Research, Inc., Chicago, Ill., a corporation of Illinois Application August 4, 1943, Serial No. 497,329

12 Claims. (Cl. 219—4)

The invention relates to the art of electric resistance welding and has reference more particularly to an improved method and apparatus for the resistance welding of metals.

Resistance welding machines have heretofore been operated from a single-phase of an alternating surrent supply. For two or three-phase power installations, which are generally used in industrial plants, this leads to an unbalanced power load and proves a major inconvenience in the case of large machines because of the high power demand. The difficulty lies in the nature of the welding transformer which can not transform a multiple phase supply into a single-phase current. An additional disturbance is caused by the high reactance of the secondary circuit of the welding machine which results in a very low power factor, usually less than thirty per cent.

An attempt has been made to improve these conditions by either using condensers in the primary circuit of the welding transformer or by using low frequency current; for example, 25 cycles instead of 60 cycles. This low frequency current is, however, rarely available and moreover the load remains unbalanced on poly-phase supply. Other solutions consisted in the use of a motor-generator which would transform the polyphase high frequency current into single-phase low frequency, but this increases substantially the cost of the installation.

Storage of energy is another attempt to solve the problem but theory and practice have shown that neither electromagnetic nor electrostatic storage welding machines can deliver currents of a duration longer than a small fraction of a second, whereas, in several cases, many seconds are necessary for the welding of heavy pieces of metal.

The present invention has for an object to provide a welding method with an improved power factor and wherein the power demand and heat losses are reduced. This method is based on the use of electromagnetic storage of energy for the purpose of obtaining a low frequency alternating welding current.

Another object is to provide a welding method based on the electromagnetic storage of energy wherein welding is effected by a low frequency alternating current produced by a plurality of primary current impulses.

Another object of the present invention is to provide a welding method wherein the current flowing in the secondary circuit during welding is a low frequency alternating current and wherein a balanced load is drawn from a two or three-phase alternating current supply.

Another object of the invention is to provide a method for resistance welding of metals wherein the welding current flowing in the secondary circuit is a low frequency alternating current having a wave shape best suited to the characteristics of the metal being welded.

Another object of the invention is to provide improved means for applying periodic impulses of direct current from a rectifier to the primary winding of a transformer and wherein the transformer is characterized by an air gap in its iron core to increase the storage of energy and to improve the wave shape of the induced welding current in the secondary circuit.

A further object is to provide a method for resistance welding of metals wherein the wave shape of the alternating current in the secondary circuit is modified by varying the voltage and the frequency independently of each other.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

The present invention is directed to a method of resistance welding using a system consisting of a resistance welding machine having a pair of electrodes, one of which is movable for applying mechanical pressure to the workpiece, and having a welding transformer including a primary circuit and a secondary circuit with an air gap in the iron core of said welding transformer. A current rectifier capable of converting multiple phase alternating current into direct current is employed in the primary circuit and mechanism is combined with said rectifier whereby periodic impulses of direct current are applied to the primary winding of the welding transformer.

Although the use of an air gap is preferred for the purpose of increasing the storage of energy and avoiding the saturation of the iron core, the invention provides also the use of an iron core with no air gap. In this case, a grade of iron having a high permeability and a low retentivity is used for the same purpose of improving the efficiency of the method.

Figure 1:
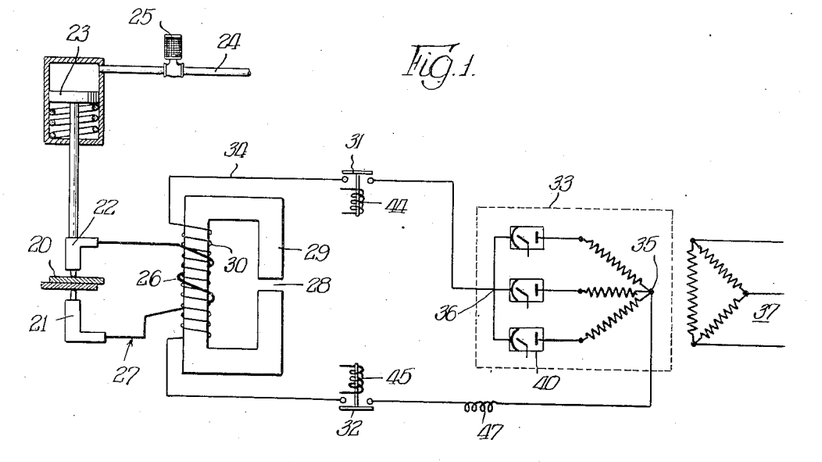
Figure 1 is a diagrammatic view illustrating a method of resistance welding coming within the invention and whereby a balanced load may be drawn from a multiple phase alternating current supply.

Referring to the form of the invention shown in Figure 1, the workpiece 20 to be welded is placed between the stationary electrode 21 and the movable electrode 22 of the welding machine. Pneumatic pressure is applied to the piston 23 from the air line 24, through operation of valve 25, thereby causing the workpiece to be placed under mechanical pressure between the electrodes 21 and 22 which are electrically connected to the secondary winding 26. Said winding and the connections to the electrodes constitute the secondary circuit 27 of the welding transformer having an air gap 28 in its iron core 29. The primary winding 30 is electrically connected through contactors 31 and 32 with a rectifier 33. One end of the primary circuit 34 is connected to the rectifier at a neutral point 35 and the other end of said primary circuit is connected to the rectifier as at 36. The source of current for the rectifier 33 is indicated by numeral 37, the same comprising a conventional three-phase alternating current supply. The rectifier 33 includes rectifying tubes 40 of the ignitron type which will be more particularly described as the description proceeds.

When the contactors 31 and 32 are closed and opened repeatedly current from the three-phase alternating supply 37 will pass through the rectifier 33 and the resulting direct current will thereupon flow through the primary winding 30. The direct current impulses flowing in the primary winding of the welding transformer induce welding current impulses in the secondary winding which will flow through the electrodes 21 and 22 and through the workpiece 20 to effect a welding of the metal parts.

Figure 2:
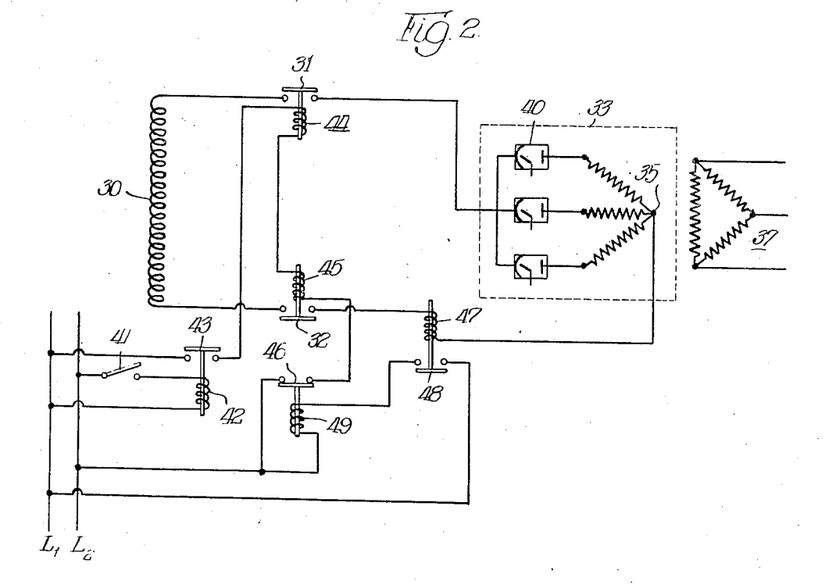
Figure 2 is a wiring diagram illustrating means for applying successive impulses of direct current to the primary of the welding transformer.

The wiring diagram of Figure 2 illustrates a preferred manner of actuating the contactors so that they make and break the primary circuit in rapid succession. The switch 41 in series with the coil 42 is connected across a source of current supply indicated by $L_1$ and $L_2$. The closing of the switch energizes the coil 42 and causes contactor 43 to close. This energizes coils 44 and 45 since the contactor 46 is closed. Energizing coils 44 and 45 effects the closing of contactors 31 and 32 and as a result direct current from the rectifier is caused to flow through the primary winding 30. When the direct current reaches a predetermined value the maximum current relay 47 is energized and contactor 48 is caused to close. Said contactor and the coil 49 in series therewith is connected across the supply lines $L_1$—$L_2$. Immediately upon the closing of contactor 48 the coil 49 is energized, causing contactor 46 to open, and as a result the main contactors 31 and 32 are deenergized, thus breaking the flow of direct current to the primary winding. This action deenergizes coil 47 of the maximum current relay and contactor 48 is caused to open. Coil 49 is thereby deenergized, with the result that contactor 46 closes, which re-establishes the circuit to coils 44 and 45. Energization thereof again causes the contactors 31 and 32 to close and another impulse of direct current flows through the primary winding. Successive impulses of direct current are intermittently supplied to the primary of the welding transformer as long as the operator maintains switch 41 in closed position.

Figure 8:
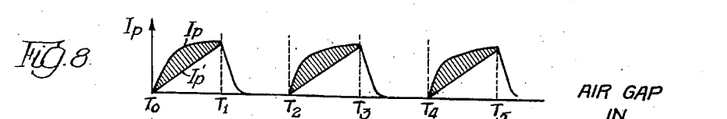
Figures 8, 9 and 10 are diagrams illustrating the behavior of the primary and secondary currents when successive unidirectional current impulses are applied to a transformer having an air gap in its iron core.

Upon the application of a D. C. voltage $E_p$ across the primary winding, a current flows in the winding and tends to reach exponentially a final steady value $$I_p = \frac{E_p}{R_p}$$

wherein the resistance of the primary winding is indicated by $R_p$. The initial slope of the $I_p$ curve is determined by the quotient of $E/L$, where L represents the self-inductance of the magnetically coupled primary and secondary windings. The subsequent slope is determined by the time constant of the circuit. Said current curve is shown in Figure 8. In said figure the curve $I_p'$ shows a current impulse with an open secondary circuit, that is, with the electrodes 21 and 22 separated from the work-piece. The shaded area between the two curves indicates the amount of energy transferred from the primary to the closed secondary during the time $T_0$—$T_1$.

Figure 10:
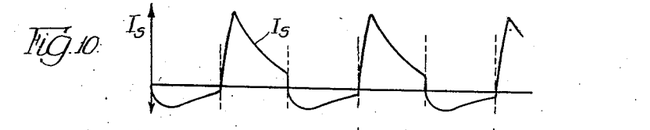

The secondary current curve $I_s$ for successive impulses is shown in Figure 10. The energy W received by the secondary circuit during each impulse, that is, the shaded area in Figure 8, is very closely represented by $$W = R_s \int_{T_0}^{T_1} I_s^2 dt$$

wherein $R_s$ is the resistance of the secondary circuit.

Figure 9:
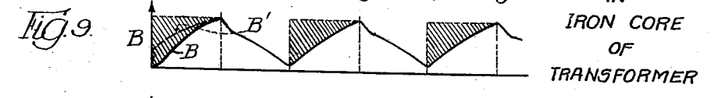

Figure 9 shows the field density B in the magnetic circuit of the iron core of the welding transformer as a function of the primary current. The shaded area indicates the electromagnetic energy stored during the impulse. At the instant $T_1$ of interruption of the current flow through the primary by opening of the contactors 31 and 32, a new current of reverse polarity is induced in the secondary circuit and which decays exponentially. The collapse of the magnetic field in the iron core of the welding transformer which induces this second current surge is not complete due to the retentivity of the iron core.

Figure 12:
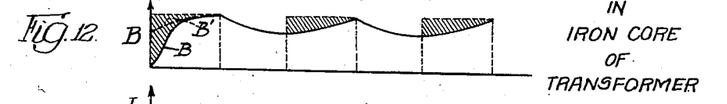

The welding transformer is provided with an air gap in the path of the magnetic field. These conditions are created to secure the storage of a substantial amount of electromagnetic energy during the current impulse. The presence of the air gap prevents the high saturation of the iron core which occurs in an ordinary transformer when submitted to uni-directional current impulses. Figure 9, for a transformer having an air gap, shows that the magnetic field collapses almost completely as indicated by the dotted line curve $B^1$ when the current $I_p$ returns to zero. In Figure 12 a similar curve is given for a transformer having no air gap. Assuming the same value of current in the primary, it will be observed that a high saturation is reached and substantial magnetism thus remains after disappearance of the current. The current induced in the secondary is therefore lower in value. These results can be improved by using a grade of iron having a high permeability and a low retentivity.

Figure 11:
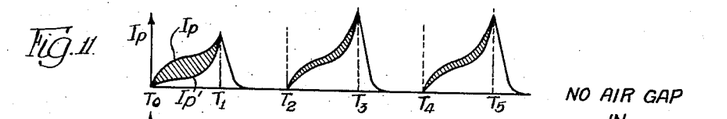
Figures 11, 12 and 13 are diagrams illustrating the behavior of the primary and secondary currents when similar unidirectional impulses are applied to a transformer without an air gap in its iron core.
Figure 13:
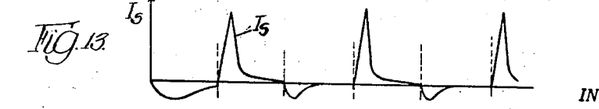

Figure 13 shows that the first impulse of current during the time $T_0$—$T_1$ produces over the time $T_1$—$T_2$ an approximately equal secondary current when no air gap is employed as is obtained when the transformer is provided with an air gap (Figure 10). Also the positive magnitude of the secondary current during the disappearance of the primary current over time $T_1$—$T_2$ is approximately the same, but decays more rapidly in Figure 13 due to the relatively small amount of energy stored. During the second current impulse $T_2$—$T_3$ the primary current rises faster than for the first impulse because the iron core already possesses a high magnetism when the current starts. Since the rate of rise of the magnetic field is slow, a small amount of power is transmitted from primary to secondary. The subsequent positive secondary current taking place over time $T_3$—$T_4$ is slightly higher than previously because the primary current is higher, as shown in Figure 11.

The primary and secondary circuits of the present transformer with an iron core of best suited characteristics and having preferably an air gap can be calculated so as to make the negative and positive secondary impulses nearly equal in magnitude. The invention therefore contemplates a welding system making use of a low frequency alternating current in the secondary circuit and which system will have the advantage that a balanced load may be drawn from a poly-phase alternating current supply line. Also there is less power and heat loss when a low frequency alternating current is used as the actual welding current. The number of cycles of this alternating current which determines the total welding time, depending on the thickness and characteristics of the material to be welded, can be controlled by means of a timer.

Figure 3:
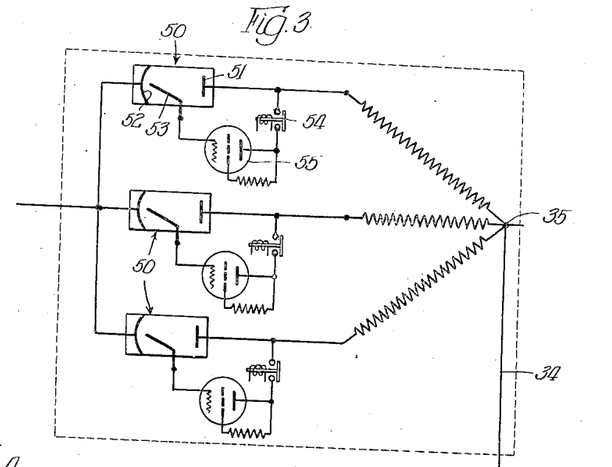
Figure 3 is a diagrammatic view illustrating one form of rectifier employing ignitrons and which provides for voltage control of the direct current impulses applied to the primary of the transformer.

With a suitable rectifier as shown as an example in Figure 3, it is possible to modify the wave shape of the secondary current since the voltage of the direct current impulses can be varied. The manner in which the wave shape can be modified is explained in detail in connection with Figures 17 to 22 inclusive. The rectifier is characterized by ignitron tubes indicated by numeral 50. Each tube includes an anode 51, a mercury cathode 52, and a firing pin 53 extending into the mercury pool. The circuit from anode to cathode through the tube is non-conducting until the mercury is ionized. When the circuit through the firing pin is closed by closing contactor 54, current will flow through the thermionic control tube 55 to the firing pin, with the result that the mercury in the ignitron tube is immediately ionized and current then flows from anode 51 to cathode 52. Current will flow in this direction only for the positive half cycle of the alternating current supply. When the negative half cycle is reached the ignitron tube ceases to be conducting and the same operation is repeated on the next positive half cycle provided the contactor 54 remains closed.

Figures 4, 5, 6:
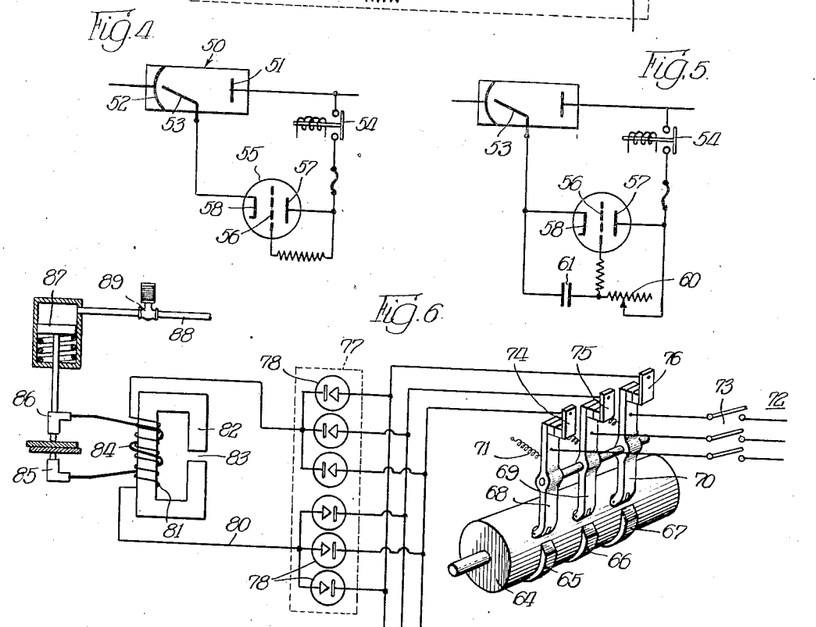
Figure 4 is a wiring diagram showing one method of firing the ignitron tubes of the rectifier.
Figure 5 is a wiring diagram illustrating another method wherein delayed firing of the ignitrons is effected.
Figure 6 is a diagrammatic view illustrating another method of resistance welding coming within the invention.

The circuit for control tube 55, which operates to deliver full voltage from the ignitrons, is shown in Figure 4. In this circuit the grid 56 is connected to the plate 57 and has the same polarity as the plate. The cathode 58 is connected to the firing pin 53. The control tube thus passes current immediately at the beginning of a positive half cycle of alternating current. Therefore the ignitron tube becomes conducting at the very beginning of each positive half cycle of the alternating current supply and accordingly full voltage is obtained in the rectified current output.

In Figure 5 the grid 56 of the control tube is connected to the plate through a variable resistor 60 and said grid is connected to the cathode through the condenser 61. When the contactor 54 is closed the control tube does not pass current immediately to the cathode since the grid remains at a negative potential with respect to the plate for a certain period. The setting of the variable resistor controls the length of this period before the grid becomes positive enough to permit current to flow through the control tube and to thus fire the ignitron. The longer the delay in firing, effected by the control tube 55, the less of each positive half cycle is passed by the ignitron and thus the voltage of the rectified current is correspondingly lower.

Control of the voltage of the primary current impulses can be accomplished by the use of a dynamo, or taps can be provided on the primary winding to control the voltage by varying the turn ratio between the primary and secondary.

In Figure 6 a modified form of the invention is disclosed wherein apparatus is employed for applying to the terminals of the rectifier periodic impulses of alternating current from a two or three-phase supply. The cam 64 is suitably driven by an electric motor or the like, not shown, to cause rotation of the three cam elements 65, 66 and 67. Said cam elements actuate the switch members 68, 69 and 70, each member being yieldingly biased in the proper direction by coil spring 71. Each switch member is also electrically connected to one terminal of the three-phase supply indicated by numeral 72, having the control switch 73. When the switch members are in contact with the cam the switch contacts 74, 75 and 76 are closed, with the result that the rectifier 77 is electrically connected to the three-phase alternating current supply. The rectifier 77 includes a plurality of individual half-wave rectifiers 78, each having connection with a wire of the three-phase supply line. The direct current from the rectifier is supplied by circuit 80 to the primary winding 81 of the welding transformer having an iron core 82 provided with an air gap 83. In the manner described with respect to Figure 1 the secondary circuit includes a winding 84 and electrodes 85 and 86. Electrode 86 is movable to and from the workpiece by means of pneumatic pressure applied to the piston 87 from the air line 88 through actuation of valve 89.

The form of the invention shown in Figure 6 also applies a plurality of uni-directional current impulses to the primary winding of the transformer to induce secondary current impulses for the welding operation. The method is similar in many respects to that described in connection with Figure 1, except that the primary circuit 80 in this form of the invention is a closed circuit and therefore upon collapse of the magnetic field in the transformer some current is absorbed from the secondary circuit by this closed primary circuit. The decay of the primary current is therefore progressive. This contrasts with the instantaneous decay of the primary current in the form of the invention shown in Figure 1.

When the switch 73 is closed current from the supply line will pass through the switch members and switch contacts each time these elements engage. This occurs once for each revolution of the cam since, as previously described, the switch members have engagement with their contacts except when the members are actuated to open position by the cam elements 65, 66 and 67, respectively. The resulting impulses of alternating current therefore pass through the rectifier which converts them to impulses of direct current which accordingly flow intermittently through the primary winding 81. The building up of a current in the primary winding and the collapse of this current induces secondary current impulses which are supplied to the electrodes for welding.

In this form of the invention the welding transformer is also supplied with an air gap identified by numeral 83 to increase the storage of energy for each impulse of direct current supplied to the primary winding. The high saturation of the iron core which would occur in an ordinary transformer when submitted to the uni-directional current impulses is also eliminated and the wave shape of the induced current in the secondary circuit is thereby improved.

Figure 14:
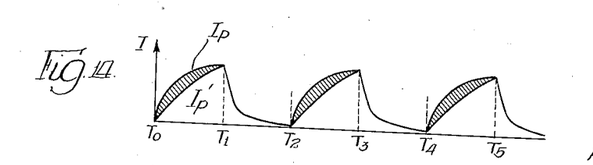
Figures 14, 15 and 16 are diagrams illustrating the behavior of the primary and secondary currents in the form of the invention shown in Figure 6.
Figure 15:
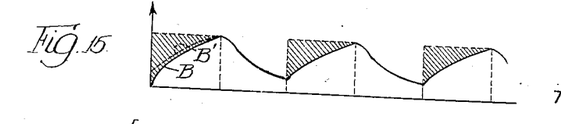
Figure 16:
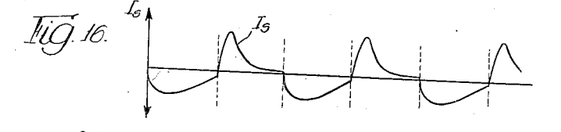

Figures 14, 15 and 16 are curves illustrating graphically the behavior of the primary and secondary currents in the form of the invention shown in Figure 6.

Figure 7:
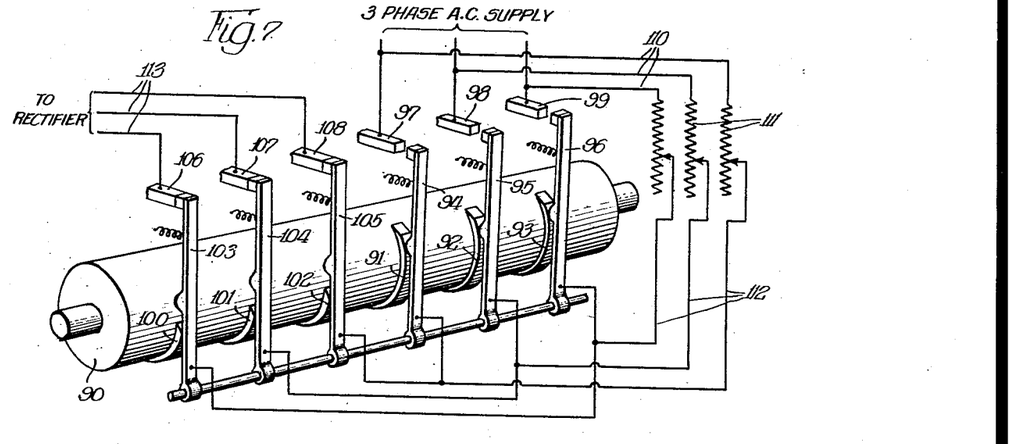
Figure 7 is a diagrammatic view illustrating a form of cam operated apparatus for modifying the wave shape of the current induced in the secondary circuit in the method illustrated in Figure 6.

It is possible to exercise some control over the wave shape of the secondary current by using the cam operated element shown in Figure 7. In this form of the invention the cam 64 is replaced by cam 90, having two sets of cam elements angularly displaced in position on the cam. The cam elements 91, 92 and 93 are positioned on cam 90 so as to initially actuate the switch members 94, 95 and 96, respectively, into open position with respect to the switch contacts 97, 98 and 99. Upon continued rotation of cam 90 switch elements 100, 101 and 102 will eventually actuate the switch members 103, 104 and 105 into an open position with respect to their contacts 106, 107 and 108. The initial opening of the first set of switch members functions to place resistance in the circuit from the alternating current supply line to the rectifier and as a result the decay of each current impulse to the primary of the transformer can be controlled to take place more gradually and thus the wave shape of the induced secondary current is correspondingly modified.

Each of the contacts 97, 98 and 99 is electrically connected to one phase of the three-phase alternating current supply. In advance of said switch contacts the conductors 110 have connection with the alternating current supply and said conductors terminate in resistors 111. Said resistors are adjustable and thus the conductors 112 may be connected at any point along said resistors to give any value of resistance desired. Said conductors 112 at their other end are electrically connected to each set of switch members. The circuit is completed by the conductors 113 which electrically connect the switch contacts 106, 107 and 108 to the rectifier.

When the switch members contact the cam 90 they have engagement with their switch contacts and the circuit to the rectifier is closed through said switch members. Switch members 94, 95 and 96 are then opened which automatically places the resistors 111 in the circuit to the rectifier. The voltage can therefore be controlled by adjusting the value of the resistance placed in the circuit. Flow of current through the resistance is momentary, however, since the switch members 103, 104 and 105 will presently open and the flow of current to the rectifier is thus terminated. Before the termination of each impulse of rectified current to the primary winding 81, the voltage is momentarily reduced and in this manner the decay of the current for each cycle is controlled to thus modify the wave shape of the induced secondary.

Figure 17:
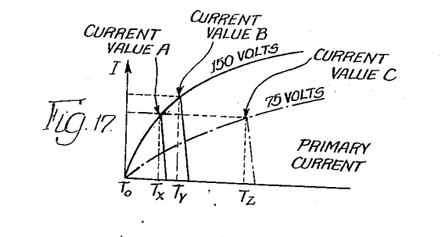
Figures 17, 18 and 19 are diagrams illustrating the manner in which the wave shape of the secondary current may be modified using the maximum current relay of Figure 1.
Figure 18:
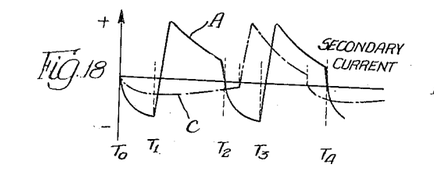
Figure 19:
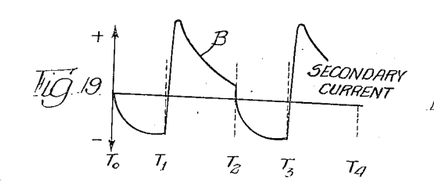

In the form of the invention shown in Figures 1 and 2 the wave shape of the secondary current can also be modified since it is possible to vary both the frequency and voltage of the primary current impulses. Figures 17, 18 and 19 are based on the use of a maximum current relay. However, it should be understood that a timer can be substituted for the maximum current relay and wave shaping of the secondary when using such a timer is diagrammatically illustrated in Figures 20, 21 and 22.

Two curves are illustrated in Figure 17, one showing the primary current as having a voltage of 150 volts and the other curve indicating a voltage of 75 volts. Primary current impulses of such voltages can be obtained by adjusting the rectifier as explained in connection with Figures 3, 4 and 5. Current values A and B are taken on the 150 volt curve, whereas, current value C is taken on the 75 volt curve. These values of primary current and others such as may be desired in actual operation are secured by a setting of the maximum current relay indicated by numeral 47 in Figures 1 and 2.

The value of the primary current indicated by A on the 150 volt curve is reached in time $T_0-T_1$ and the contactors in the primary circuit are caused to open when this value is reached and the current in the primary winding decays rapidly as diagrammatically illustrated. The building up and decay of said current in the primary winding induces an alternating current in the secondary which is represented in Figure 18 as curve A. It will be noted that the wave shape of this curve differs somewhat from that shown in Figures 10 and 16 notwithstanding that the time $T_1-T_2$ is the same in all instances since the opening time for the contactors in the primary circuit depends on the characteristics of the particular coils shown in the wiring diagram, Figure 2. Only the setting of the maximum current relay has been changed. The constants of the control circuit, which determine the opening time for the contactors, have not been changed, and thus time $T_1$—$T_2$ is the same for all curves in Figures 10, 16, 18 and 19.

In Figure 18 the dot and dash curve C represents the induced alternating current in the secondary for the value of primary current shown in Figure 17 which has been taken on the 75 volt curve. For illustrative purposes current value C has been made the same as current value A. However, since the voltage is reduced by half, the current takes a longer time to build up to the same value which is represented in Figure 17 as time $T_0$—$T_x$. It will be observed that reducing the voltage of the primary current impulses has the effect of lowering the frequency of the induced secondary current. Although the charging or building up time is greater for C, the same amount of energy is stored in the welding transformer and therefore the positive surges on both curves A and C, as shown in Figure 18, have the same magnitude.

Curve B, shown in Figure 19, represents current value B on a 150 volt curve. The wave shape of the induced alternating current in the secondary is again modified somewhat since the time required before said current value is reached is now indicated by $T_0$—$T_y$. The magnitude of the secondary current on both negative and positive surges is in excess of that shown for curves A and C since it will be understood that a greater amount of energy is stored in the welding transformer in this particular instance.

Figure 20:
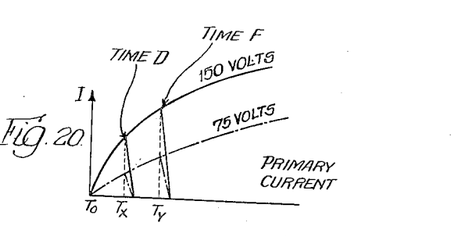
Figures 20, 21 and 22 are similar diagrams showing the manner of modifying the wave shape of the secondary current when a timing device is substituted for the maximum current relay.
Figure 21:
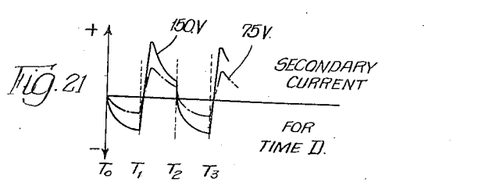
Figure 22:
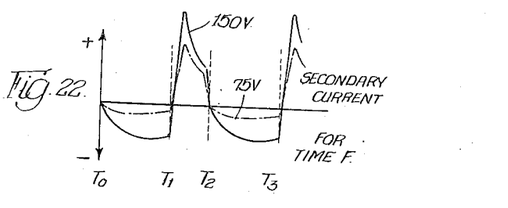

Figures 20, 21 and 22 diagrammatically illustrate the manner in which the secondary current is wave shaped when using a timer in the place of a maximum current relay. In Figure 20 two curves are shown, one for 150 volts and one for 75 volts. Figure 21 illustrates the induced secondary current for said voltages when the timer is set for time D. The two alternating current waves of Figure 21 are identical as regards wave shape but the magnitude of the negative and positive surges of the low voltage curve shown in dot and dash is proportionately less than that for the high voltage curve.

Figure 22 illustrates the modification in the wave shape of the induced secondary current when the timer is changed to time F. The two curves are substantially identical in shape except that they differ as regards the magnitude of the negative and positive surges. The negative surge for the 150 volt curve is in excess of that for the 75 volt curve, which latter is shown as a dot and dash line. In a similar manner the positive peaks for the 150 volt curve are correspondingly greater than that for the low voltage curve.

One or two timers can be used in the form of the invention shown in Figures 1 and 2. When one timer is used the same is substituted for the maximum current relay. In such a case the timer controls the closing time of the contactors and the interval during which said contactors remain open is controlled by the constants of the circuit. When two timers are used both the closing time and the opening time of the contactors can be regulated and such regulation will of course affect the frequency of the primary current impulses and thus the frequency of the alternating secondary current.

The present invention contemplates the wave shaping of the alternating secondary current in order to secure a wave shape best suited to the characteristics of the metal being welded. Iron or steel, for example, have different characteristics than aluminum. Iron accumulates the heat faster than aluminum and has the ability to retain said heat for a longer period of time. Thus the wave shape, which has the desired heating effect on the metal, depending on its characteristics, is selected when the metal is welded. Another important advantage of the present invention resides in the production of a welding current having a frequency lower than the frequency of the supply system wherein a balanced load may be drawn from a multi-phase alternating current supply. Whereas, the poly-phase supply is the conventional sixty cycle current, the current in the secondary circuit used for welding has a frequency which may range from less than 1 to 20 cycles per second. This low frequency effects a corresponding reduction in the reactance of the secondary circuit.

The improved method of the invention has application to various types of resistance welding, spot and seam welding, butt and flash welding, resistance forging and heating.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. The method of producing a low frequency alternating current in the secondary load circuit of a welding transformer, which consists in supplying successive impulses of direct current to the primary winding of the welding transformer, whereby the magnetic flux in the transformer rises to a maximum for each impulse and then collapses to induce an alternating current in the secondary having a frequency equal to that of the impulses, controlling the frequency and the voltage of said impulses to maintain the values thereof substantially constant during a welding operation, and selecting a value for the frequency and a value for the voltage within their respective ranges to produce an alternating current in the load circuit having the desired wave shape.

2. The method of producing a low frequency alternating current in the secondary load circuit of a welding transformer, which consists in supplying successive impulses of direct current to the primary winding of the welding transformer, whereby the magnetic flux in the transformer rises to a maximum for each impulse and then collapses to induce an alternating current in the secondary having a frequency equal to that of the impulses, controlling the frequency of said impulses for a given constant voltage by controlling the maximum current for each impulse and the time between impulses, and in adjusting the voltage of said impulses to produce an alternating current in the load circuit having the desired wave shape.

3. The method of producing a low frequency alternating current in the secondary load circuit of a welding transformer, which consists in supplying successive impulses of direct current to the primary winding of the welding transformer, whereby the magnetic flux in the transformer rises to a maximum for each impulse and then collapses to induce an alternating current in the secondary having a frequency equal to that of the impulses, controlling the frequency of said impulses by controlling the time of current flow for each impulse and the time between impulses, and in adjusting the voltage of the impulses to produce an alternating current in the load circuit having the desired wave shape.

4. The method of producing a low frequency alternating current in the secondary load circuit of a welding transformer and wherein a balanced load is drawn from a polyphase alternating current supply of conventional frequency, which consists in rectifying said alternating supply current to direct current, supplying successive impulses of said direct current to the primary winding of the welding transformer at a frequency ranging from less than 1 to 20 cycles per second, whereby the magnetic flux in the transformer rises to a maximum for each impulse and then collapses to induce an alternating current in the secondary having a frequency equal to that of the impulses, controlling the frequency and the voltage of said impulses to maintain the values thereof constant during a welding operation, and selecting a value for the voltage with respect to the frequency to produce an alternating current in the load circuit having the desired wave shape.

5. The method of producing a low frequency alternating current in the secondary load circuit of a welding transformer and wherein a balanced load is drawn from a polyphase alternating current supply of conventional frequency, which consists in rectifying said alternating supply current to direct current, supplying successive impulses of said direct current to the primary winding of the welding transformer by alternately connecting and disconnecting the primary circuit with said source of direct current, whereby the magnetic flux in the transformer rises to a maximum for each impulse and then collapses to induce an alternating current in the secondary having a frequency equal to that of the impulses, controlling the frequency and the voltage of said impulses to maintain the values thereof substantially constant during a welding operation, and selecting a voltage and frequency for the direct current impulses to secure a wave shape in the alternating secondary current best suited to the characteristics of the metal to be welded.

6. A method of operating a resistance welder wherein energy is stored in a transformer by flowing a charging current through the primary winding thereof, and wherein a welding load circuit is connected to the secondary winding, the steps which consist in supplying successive impulses of direct current to the primary winding to induce an alternating current in the load circuit by the rise and decay of each current impulse, the negative half cycles of said induced alternating current resulting from the rise in the current which stores energy on each impulse and the positive half cycles resulting from transfer of the stored energy during decay of each current impulse, whereby said induced alternating current has a frequency equal to that of the impulses, and in modifying the wave shape of the alternating current by varying the voltage and the frequency of said direct current impulses independently of each other.

7. Apparatus for the electric resistance welding of metals, in combination, a welding load circuit including the secondary winding of a welding transformer, a source of direct current, means supplying successive impulses of said direct current to the primary winding of said transformer, whereby an alternating current is induced in the load circuit by the rise and decay of each current impulse, the negative half cycles of said induced alternating current resulting from the rise in the current which stores energy on each impulse and the positive half cycles resulting from transfer of the stored energy during decay of each current impulse, said welding transformer having an air gap in its iron core to increase the storage of energy, thereby improving the wave shape of the induced alternating current by substantially equalizing the negative and positive peaks of said current, and means for controlling the frequency of said direct current impulses.

8. Apparatus for the electric resistance welding of metals, in combination, a welding load circuit including the secondary winding of a welding transformer, a source of direct current, means supplying successive impulses of said direct current to the primary winding of said transformer, whereby an alternating current is induced in the load circuit by the rise and decay of each current impulse, the negative half cycles of said induced alternating current resulting from the rise in the current which stores energy on each impulse and the positive half cycles resulting from transfer of the stored energy during decay of each current impulse, said welding transformer having an air gap in its iron core to increase the storage of energy, thereby improving the wave shape of the induced alternating current by substantially equalizing the negative and positive peaks of said current, and adjustable means for varying the voltage of said direct current impulses.

9. Apparatus for the electric resistance welding of metals, in combination, a welding load circuit including the secondary winding of a welding transformer, a rectifier for rectifying conventional alternating current, the direct current output of said rectifier being electrically connected to the primary circuit of the welding transformer, means for closing and opening said primary circuit to apply successive impulses of direct current to the primary winding, whereby an alternating current is induced in the load circuit by the rise and decay of each current impulse, the negative half cycles of said induced alternating current resulting from the rise in the current which stores energy on each impulse and the positive half cycles resulting from transfer of the stored energy during decay of each current impulse, said welding transformer having an air gap in its iron core to increase the storage of energy, thereby improving the wave shape of the induced alternating current by substantially equalizing the negative and positive peaks of said current, means for controlling the frequency of said direct current impulses, and adjustable means for varying the voltage of said impulses.

10. Apparatus for the electric resistance welding of metals comprising welding electrodes for clamping the workpiece between them, a welding transformer having its secondary circuit connected to said electrodes, a rectifier for rectifying conventional alternating current, a closed primary circuit electrically connecting the primary winding of the welding transformer to the direct current output side of said rectifier, means electrically connecting with the input of said rectifier for supplying intermittent impulses of conventional alternating current, whereby the same are rectified and supplied to the primary circuit as successive impulses of direct current to induce an alternating current in the secondary circuit having a frequency equal to that of the direct current impulses, and said welding transformer having an air gap in its iron core to prevent high saturation of the iron core by the uni-directional current impulses.

11. A method of electric welding which consists in applying impulses of direct current to the primary winding of a welding transformer intermittently and at a frequency ranging from less than 1 to 20 per second, whereby an alternating current is induced in the secondary circuit of the welding transformer having a frequency equal to that of the direct current impulses, and causing the alternating current in the secondary circuit to flow through the workpiece in a manner to weld the same.

12. A method of electric resistance welding whereby a balanced load is drawn from a polyphase alternating supply of conventional sixty cycle current, which consists in rectifying said alternating supply current to direct current, applying impulses of said direct current intermittently to the primary winding of a welding transformer, whereby said impulses of direct current induce in the secondary circuit of the welding transformer an alternating current having a frequency equal to that of the direct current impulses, causing the alternating current in the secondary circuit to flow through the workpiece in a manner to weld the same, and in applying said direct current impulses to the primary winding of the welding transformer at a rate ranging from less than 1 to 20 per second, whereby the induced alternating current in the secondary circuit has a relatively low frequency.

DAVID SCIAKY.